United States Patent
Colgan et al.

(10) Patent No.: US 6,346,158 B1
(45) Date of Patent: Feb. 12, 2002

(54) ALIGNMENT OF LENTICULAR SHEETS

(75) Inventors: Evan George Colgan, Chestnut Ridge, NY (US); Tsuneo Heito, Kohka-gun (JP); Michikazu Noguchi; Masaru Suzuki, both of Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,344

(22) Filed: Apr. 19, 2000

(51) Int. Cl.⁷ .......................... B32B 31/28; G03B 35/24
(52) U.S. Cl. ............... 156/64; 156/83; 156/84; 156/275.7; 156/273.3; 156/273.5
(58) Field of Search ............... 156/64, 83, 84, 156/85, 273.3, 273.5, 275.1, 275.3, 275.5, 275.7, 290; 359/463, 619; 349/15, 57, 95; 353/7, 10, 38; 355/22

(56) References Cited

U.S. PATENT DOCUMENTS

| | | | |
|---|---|---|---|
| 5,391,254 A | * 2/1995 | Morton | 156/494 |
| 5,466,723 A | 11/1995 | Dotson | |
| 5,473,406 A | * 12/1995 | Hassall et al. | 355/22 |
| 5,822,038 A | 10/1998 | Slater et al. | |

* cited by examiner

Primary Examiner—Michael A. Tolin
(74) Attorney, Agent, or Firm—F. Chau & Associates, LLP

(57) ABSTRACT

A method for aligning a lenticular sheet, in accordance with the present invention, includes applying curable adhesive to a surface and placing a lenticular sheet over the curable adhesive on the surface. The adhesive is cured at a first end portion of the lenticular sheet such that the first end portion is aligned with a first reference position. A temperature of the lenticular sheet is adjusted to align a second end portion of the lenticular sheet with a second reference position. Remaining portions of adhesive are cured to secure the lenticular sheet.

18 Claims, 2 Drawing Sheets

ALIGNMENT OF LENTICULAR SHEETS

BACKGROUND OF THE INVENTION

1. Field of the Invention

The present invention relates to display fabrication, and more particularly to an improved method for aligning lenticular sheets with active pitch control for display devices.

2. Description of the Related Art

Displays, such as, liquid crystal displays, have found a wide range of uses in modern electronic equipment. With the improvement of viewing quality and the reduction of viewing angle limitations, liquid crystal displays have become more appealing for a plurality of new applications and well as more desirable for old applications. Different effects are sometimes desirable for these display screens. One effect may be realized by the inclusion of a lenticular sheet.

Lenticular arrays or sheets may be employed on a display screen or on a photograph to give the appearance of depth to the image displayed. The lenticular sheet or array focuses light in a desired way to provide improved viewing angle or to cause the eye of a viewer to see different elements of the overall image. Lenticular sheets typically include a plurality of parallel convex lines which function as lens' for directing light from an underlying pixel or image.

In many instances, especially for display screens, it is necessary to align a lenticular sheet with underlying components. In the case of displays, it is desirable to align the lenticular sheet relative to a black matrix layer patterned on glass. The black matrix functions as a barrier to any undesirable light transmission or reflections occurring in the vicinity of light transmitting components, such as pixel electrodes. Alignment of the lenticular sheet needs to be consistent with the underlying components with an accuracy of, for example, a few microns across the entire width of a display which can be 28 cm or more wide.

It is very difficult to fabricate the lenticular sheet with the needed accuracy since any pitch error can result in a large cumulative pitch error when there are, for example, a thousand or more lenticular lines needed for each display. Further, problems arise when shifts in the lenticular sheet occur or temperature variations occur during processing.

For the pitch error to be less than 20 microns, for example, the individual lenticular pitch should have a systematic variation of less than 0.02 microns. This is compounded by the need for very precise temperature control due to large thermal coefficients of expansion of plastics used for lenticular sheets.

Therefore, a need exists for a method for aligning lenticular sheets which accounts for process and temperature variations. A further need exits for a method for accurately aligning lenticular sheets with active control.

SUMMARY OF THE INVENTION

A method for aligning a lenticular sheet, in accordance with the present invention, includes applying curable, preferably transparent, adhesive to a surface and placing a lenticular sheet over the curable adhesive on the surface. The adhesive is cured at a first end portion of the lenticular sheet such that the first end portion is aligned with a first reference position. A temperature of the lenticular sheet is adjusted to align a second end portion of the lenticular sheet with a second reference position. Remaining portions of adhesive are cured to secure the lenticular sheet.

In other methods, the curable adhesive is preferably cured by applying radiation. The surface may include a polarizer for a display device. The surface may includes a color filter for a display device. The first reference position may include one of a pixel and a feature of a black matrix layer. The second reference position may include one of a pixel and a feature of a black matrix layer. The step of adjusting a temperature of the lenticular sheet may include the step of heating the surface to expand the lenticular sheet. The step of adjusting a temperature of the lenticular sheet may include the step of cooling the surface to contract the lenticular sheet. The step of adjusting a temperature of the lenticular sheet may include step of heating the lenticular sheet with an infrared heater. The first end portion may be aligned with a first reference position by employing alignment marks. The second end portion may be aligned with a second reference position by employing alignment marks. The step of adjusting a temperature of the lenticular sheet may include the steps of modifying the temperature of the lenticular sheet, observing a change in position of the lenticular sheet with respect to the second reference position, and readjusting the temperature to provide alignment between the lenticular sheet and the second reference position.

Another method for aligning a lenticular sheet, in accordance with the present invention includes the steps of providing a lenticular sheet having a plurality of lenticulars, applying a curable adhesive on a surface of a display device, the display device including a plurality of pixels, placing the lenticular sheet over the curable adhesive, aligning a first lenticular of the lenticular sheet with a first pixel position, curing the adhesive at the first pixel position to secure the lenticular sheet at the first pixel position, adjusting a temperature of the lenticular sheet to align a second lenticular of the lenticular sheet with a second pixel position wherein the first and second pixel portions are set apart from one another, and curing remaining portions of adhesive to secure the lenticular sheet such that alignment between the plurality of pixels and the plurality of lenticulars is achieved between the first and second pixel positions.

In other methods, the curable adhesive is preferably cured by applying ultra violet radiation. The surface may include a polarizer for the display device. The step of adjusting a temperature of the lenticular sheet may include the step of heating the surface to expand the lenticular sheet, or cooling the surface to contract the lenticular sheet. The step of adjusting a temperature of the lenticular sheet may include the steps of modifying the temperature of the lenticular sheet, observing a change in position of the lenticular sheet with respect to the second pixel position, and readjusting the temperature to provide alignment between the lenticular sheet and the second pixel position.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention includes a method for adjusting a lenticular sheet during attachment to a display. The method accounts for the temperature and other misalignments of the lenticular sheet which may occur during the alignment process. This limits pitch error in the lenticular sheet to reduce misalignment in the final assembly. The present invention will now illustratively be described in terms of a liquid crystal display device; however, the present invention is broader and should not be construed by the illustrative examples set forth herein.

Figure 1:
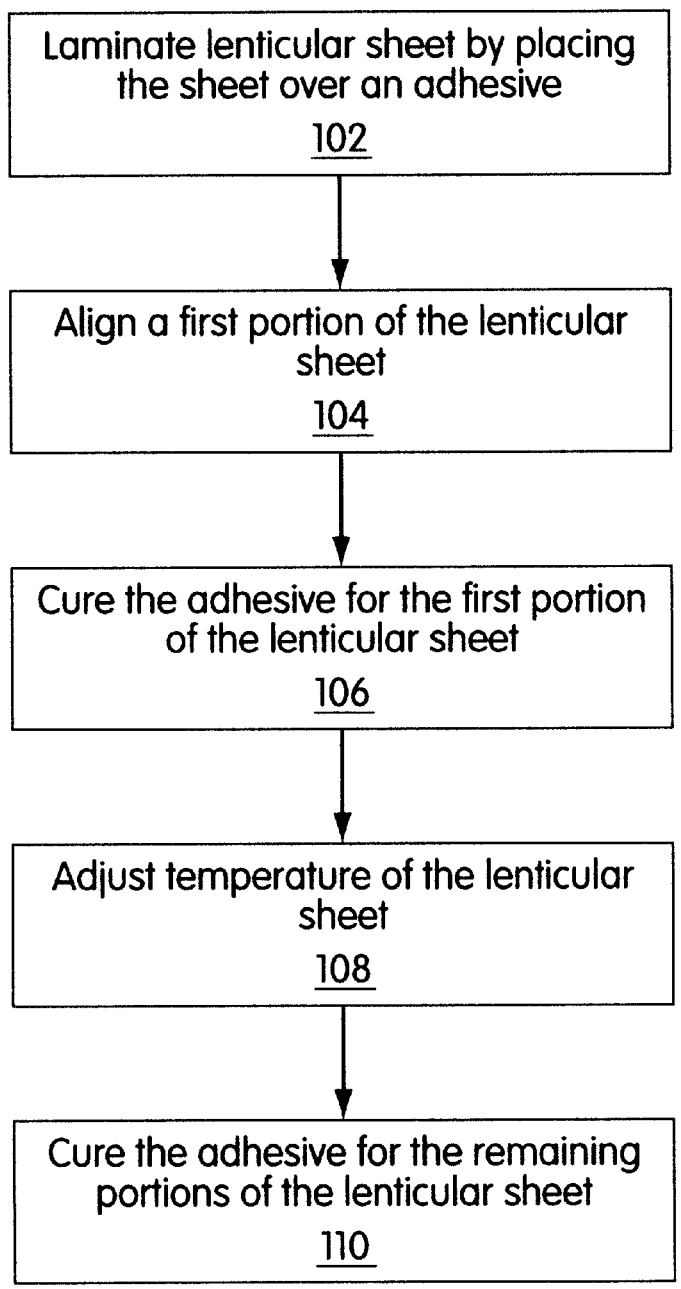
FIG. 1 is a flow diagram for a method for aligning a lenticular sheet in accordance with the present invention.

Referring now to the drawings in which like numerals represent the same or similar elements and initially to FIG. 1, a flow chart is shown for a method for aligning lenticular sheets in accordance with the present invention. In block 102, a lenticular sheet is laminated onto a surface, for example on a back polarizer. The lenticular sheet may include a plastic material, such as, PET (polyethylene terephthalate) or other materials, such as acrylic, polycarbonate or vinyl. A back polarizer may be attached to an active or passive matrix displays, such as for example, liquid crystal displays, to polarize light transmitted through the liquid crystal material of the display. A low viscosity ultraviolet (UV) adhesive, for example, Norland optical adhesive 72 or 83H, available from Norland Products may be employed to laminate the lenticular sheet to the back polarizer. Other curable adhesives may also be employed.

The lamination permits the lenticular sheet to be shifted into alignment. In block 104, a first portion of the lenticular sheet is shifted into alignment. In one embodiment, one edge of the lenticular sheet is aligned with, for example, a black matrix layer or a pixel or pixels of the display using alignment marks or other alignment means, such as, for example, fiducial marks, light transmitted through an opening or by other means. An active control device may be employed to adjust the lenticular sheet with respect to a feedback control. For example, a light sensor may be employed to provide light intensity information at predetermined positions. The light intensity is monitored to optimize the alignment of the lenticular sheet. Once the first edge is aligned, the UV adhesive is cured along that edge by exposure to radiation, for example, UV light in block 106.

In block 108, the temperature of the lenticular sheet is increased or decreased. Heating may be achieved by using an infrared (IR) lamp, convective heaters, such as a heat gun or other heating means. Cooling may be achieved by convective cooling, e.g., cool air over the lenticular sheet or by other cooling means. The alignment of the lenticular sheet along a second edge of the display is monitored, for example, using alignment marks to compare the position of the lenticular sheet to the black matrix or to a column or row of pixel openings in the black matrix. The temperature of lenticular sheet is adjusted so that an optimized alignment is achieved. The temperature is preferably adjusted when equilibrium has been achieved for the previous temperature. The adjustment of the temperature may be performed in a series of incremental steps. Once the second edge has been aligned, the remaining UV adhesive is cured by exposure to UV light in block 110.

Adjustment of lenticular sheet is preferably performed by growing the lenticular sheet by heating. Although cooling the lenticular sheet to shrink the sheet may also be performed. It is desirable to have any systematic error of the lenticular pitch be on the "short" side as it is easier to heat the lenticular sheet then cool the sheet. Cooling would be necessary if the lenticular pitch is "long". Although the above example is described in terms of lenticular sheet edges, intermediate lenticulars (e.g., between the edges) may also aligned in accordance with the above method. It is contemplated that intermediate pixels may be aligned to intermediate lenticulars to further reduce pitch error, and the adhesive cured at the aligned location when aligned by adjusting the temperature. This may be performed at a plurality of intermediate sites along the lenticular sheet.

The present inventors have experimentally verified that the lenticular pitch can be adjusted by temperature. In one experiment, after placing a UV cast lenticular sheet laminated to a color filter with water in a 50 C oven, the unsecured edge of the lenticular sheet was found to have moved by about 90 microns from its initial position. This provides much leeway in the alignment of the lenticular sheet to a black matrix or to pixel electrodes to correct for any pitch error therebetween.

A pitch error may be caused by temperature effects such as ambient temperature changes or inherent properties of the base material used for the lenticular sheet. For example, unrelieved stress in the sheet may be a cause for pitch id. error, or the absorption of moisture from the ambient.

Figure 2:
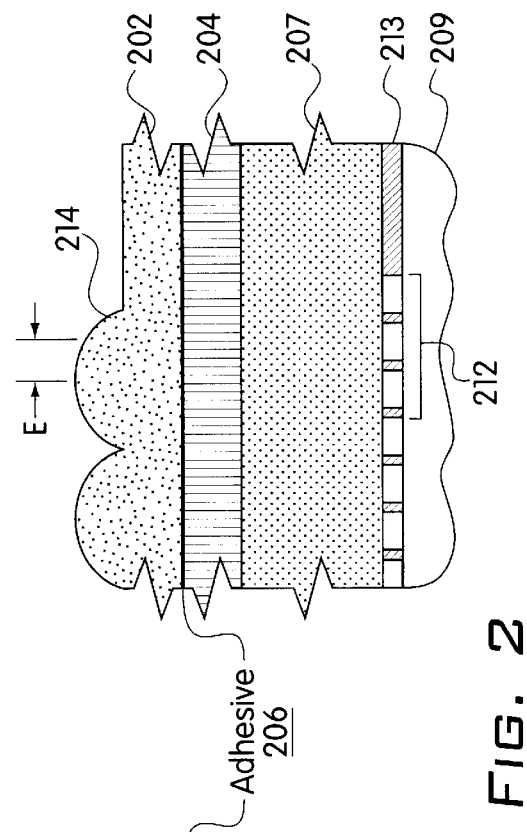
FIG. 2 is a cross-sectional view of a display device showing a first lenticular aligned in accordance with the present invention.

In some instances, these inherent properties are common for a batch of lenticular sheets. In these cases, if the pitch error is very nearly identical for the batch of lenticular sheets, an alternate method of alignment may include heating the alignment tooling (which directly contacts the display and lenticular sheet), display, and lenticular to the desired temperature and not make unique temperature adjustments for each individual lenticular sheet. In this way, a single set temperature for the alignment equipment and the substrate (e.g., color filter, polarizer, glass, etc.) should account for any pitch error by providing a set amount of growth or contraction of the lenticular sheet. Referring to FIG. 2, a cross-section of a display device 200 is shown to illustratively depict the present invention. A lenticular sheet 202 is laminated onto a polarizer 204 with a UV curable adhesive 206. Adhesive 206 may include a layer thickness of about 10 microns. Polarizer 204 is laminated on a color filter plate 207. A substrate 209 may be employed to support display device. Lenticular sheet 202 may include PET, acrylic, polycarbonate or vinyl. In one embodiment, expansion of PET (the base plastic of the lenticular sheet) is about 15 ppm/° C. The total sheet may be, for example, about 28 cm wide. Therefore, a temperature change of 1° C. would result in an expansion/contraction of about $280,000 \times 15 \times 10^{-6} \times 1 = 4$ microns for this material. A first lenticular 208 is aligned to a first pixel 210 (pixels are illustratively divided into three subpixels, e.g., red, green and blue sub-pixels). In this case, lenticulars are aligned to a center of each pixel. Other alignment references are also contemplated. For example, each lens or lenticular may be aligned to a pixel edge, or edges of lens' may be aligned to features of a patterned black matrix layer 213 or to other components, such as, an underlying image or feature. Lenticular 208 may be aligned by visual inspection, reflected/transmitted light feedback or by employing alignment marks between lenticular sheet 202 and underlying layers or components, or special marks outside the active area of the display.

Once lenticular 208 is correctly aligned along one edge, UV curable adhesive 206 in that region is cured by exposure to UV light to partially secure lenticular sheet 202. UV light is prevented from curing in other regions by excluding UV radiation on other parts of sheet 202. For example, localized UV light may be employed in only the region to be cured or UV light can be blocked with a shield in areas where adhesive 206 should not yet be cured.

Note, in the case shown in FIG. 2, a lenticular pitch error E shows a discrepancy from the center of a pixel 212 and a center line of a lenticular 214 at the other edge of the display. Lenticular 214 is misaligned by about M pixel.

Figure 3:
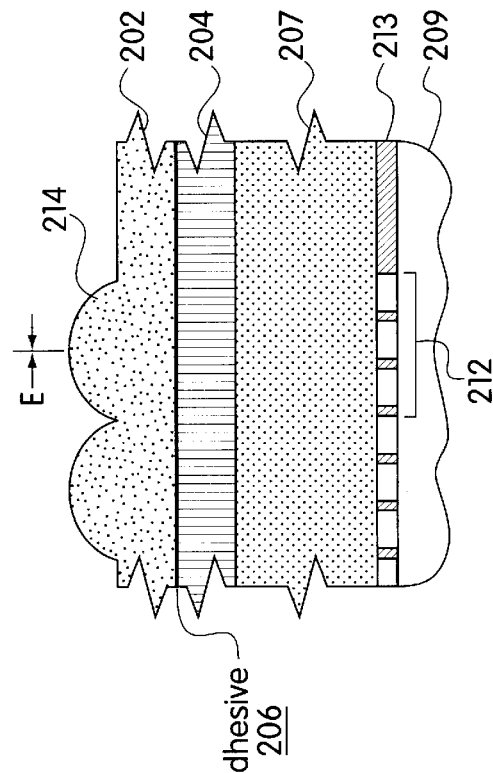
FIG. 3 is a cross-sectional view of the display device of FIG. 2 showing a second lenticular aligned after heating in accordance with the present invention.

Referring to FIG. 3, heat has been applied to lenticular sheet 202 so that it has expanded more than color filter plate 207. Color filter plate 207 may include glass, for example. In one embodiment, Corning 1737 glass, available from Corning Inc., may be used, which has a thermal coefficient of expansion of about 3.7 ppm/° C. This is less than 15 ppm/° C. if PET is employed for sheet 202. By applying heat, lenticular 214 is correctly aligned to pixel 212 (e.g., E (error) is approximately 0). UV light is then applied to cure adhesive 206 in remaining areas to secure lenticular sheet 202.

The lenticular sheet may include a plastic material or other flexible material. Rigid material such as glass may be employed for lenticular sheet as well. It is to be understood that the coefficient of thermal expansion (CTE) of the lenticular sheet should be consistent with underlying layers of the device on which the lenticular sheet is to be mounted. For example, if alignment of the lenticular sheet is to be performed be heating or cooling and the device is mounted on a glass substrate, the lenticular sheet should have a CTE which is greater than the substrate or other underlying layer which includes the components in which lenticulars are to be aligned.

Having described preferred embodiments for alignment of lenticular sheets (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for aligning a lenticular sheet comprising the steps of:

applying curable adhesive to a surface;

placing a lenticular sheet over the curable adhesive on the surface;

curing the adhesive at a first end portion of the lenticular sheet such that the first end portion is aligned with a first reference position;

adjusting a temperature of the lenticular sheet to align a second end portion of the lenticular sheet with a second reference position; and curing remaining portions of adhesive to secure the lenticular sheet.

2. The method as recited in claim 1, wherein the curable adhesive is cured by applying radiation.

3. The method as recited in claim 1, wherein the surface includes a polarizer for a display device.

4. The method as recited in claim 1, wherein the surface includes a color filter for a display device.

5. The method as recited in claim 1, wherein the first reference position includes one of a pixel and a feature of a black matrix layer.

6. The method as recited in claim 1, wherein the second reference position includes one of a pixel and a feature of a black matrix layer.

7. The method as recited in claim 1, wherein the step of adjusting a temperature of the lenticular sheet includes the step of heating the surface to expand the lenticular sheet.

8. The method as recited in claim 1, wherein the step of adjusting a temperature of the lenticular sheet includes the step of cooling the surface to contract the lenticular sheet.

9. The method as recited in claim 1, wherein the step of adjusting a temperature of the lenticular sheet includes the step of heating the lenticular sheet with an infrared heater.

10. The method as recited in claim 1, wherein the first end portion is aligned with a first reference position by employing alignment marks.

11. The method as recited in claim 1, wherein the second end portion is aligned with a second reference position by employing alignment marks.

12. The method as recited in claim 1, wherein the step of adjusting a temperature of the lenticular sheet includes the steps of:

modifying the temperature of the lenticular sheet;

observing a change in position of the lenticular sheet with respect to the second reference position; and readjusting the temperature to provide alignment between the lenticular sheet and the second reference position.

13. A method for aligning a lenticular sheet comprising the steps of:

providing a lenticular sheet having a plurality of lenticulars;

applying a curable adhesive on a surface of a display device, the display device including a plurality of pixels;

placing the lenticular sheet over the curable adhesive;

aligning a first lenticular of the lenticular sheet with a first pixel position;

curing the adhesive at the first pixel position to secure the lenticular sheet at the first pixel position;

adjusting a temperature of the lenticular sheet to align a second lenticular of the lenticular sheet with a second pixel position wherein the first and second pixel portions are set apart from one another; and curing remaining portions of adhesive to secure the lenticular sheet such that alignment between the plurality of pixels and the plurality of lenticulars is achieved between the first and second pixel positions.

14. The method as recited in claim 13, wherein the curable adhesive is cured by applying ultra violet radiation.

15. The method as recited in claim 13, wherein the surface includes a polarizer for the display device.

16. The method as recited in claim 13, wherein the step of adjusting a temperature of the lenticular sheet includes the step of heating the surface to expand the lenticular sheet.

17. The method as recited in claim 13, wherein the step of adjusting a temperature of the lenticular sheet includes the step of cooling the surface to contract the lenticular sheet.

18. The method as recited in claim 13, wherein the step of adjusting a temperature of the lenticular sheet includes the steps of:

modifying the temperature of the lenticular sheet;

observing a change in position of the lenticular sheet with respect to the second pixel position; and readjusting the temperature to provide alignment between the lenticular sheet and the second pixel position.

* * * * *